United States Patent Office 3,551,513
Patented Dec. 29, 1970

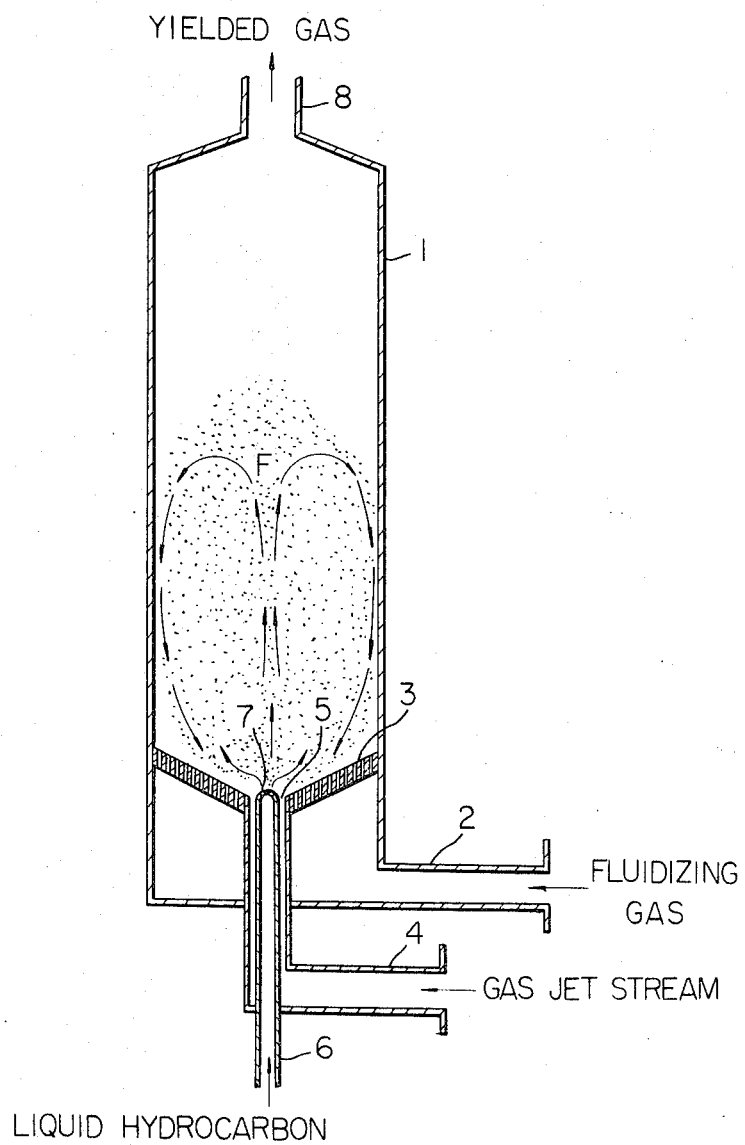

3,551,513
PROCESS FOR THE PREPARATION OF OLEFINS BY CRACKING OF LIQUID HYDROCARBON
Yuichi Suzukawa, Hisashi Kono, Kenji Terai, and Takazumi Niwa, Ube-shi, Japan, assignors to Ube Industries, Ltd., Nishihonmachi, Ube-shi, Yamaguchi-ken, Japan, a corporation of Japan
Filed Apr. 23, 1968, Ser. No. 723,543
Claims priority, application Japan, Apr. 25, 1967, 42/25,995
Int. Cl. C07c *3/30;* C10g *13/18*
U.S. Cl. 260—683
8 Claims

ABSTRACT OF THE DISCLOSURE

Process for preparing olefins from liquid hydrocarbon which comprises cracking liquid hydrocarbon by contacting the hydrocarbon with a bed of solid particles fluidized by a fluidizing gas containing oxygen and steam at a temperature of from 600 to 1000° C. for from 0.05 to 3 seconds, characterized by feeding a part of the fluidizing gas to the fluidized bed through a gas distributor provided below the fluidized bed, directly injecting the other part of said fluidizing gas as a jet stream into the fluidized bed through injection openings at a linear gas velocity higher than the superficial velocity of the whole fluidizing gas in the bed, thereby forcing the solid particles in the bed to flow circulatingly and feeding the liquid hydrocarbon into the fluidized bed.

---

This invention relates to a process for the preparation of olefins by thermal cracking of liquid hydrocarbon in a fluidized bed in which a forced circulation flow of solid particles is caused to occur.

There have been proposed many processes for the preparation of olefins by the thermal cracking of liquid hydrocarbon in fluidized beds of solid particles. However, in the conventional processes, as the dispersion of liquid hydrocarbon into a fluidized bed is insufficient, it is difficult to carry out the thermal cracking efficiently and to produce olefins in high yields. For instance, in the process disclosed in Japanese patent publication No. 8329/65 the flow area of solid particles in a conventional fluidized bed is restricted to a narrow range and therefore there occurs no substantial circulation flow of the solid particles in the bed, with the consequence that liquid hydrocarbon does not disperse sufficiently throughout the bed. More specifically, in the vicinity of the nozzle used for feeding liquid hydrocarbon, solid particles upon which droplets of atomized liquid hydrocarbon have been blown do not disperse immediately, and remain in the vicinity of the nozzle for a while. Furthermore, the rate of thermal cracking is not so high as that of dispersion of droplets and there are formed thick films of liquid hydrocarbon on their surfaces. Thus, the conventional fluidized bed is divided into two regions, a lower combustion region, and an upper cracking region, and the total surface area for thermal cracking is reduced further. Accordingly, the rate of thermal cracking of liquid hydrocarbon is reduced.

In another conventional process using a so-called spouted bed, solid particles are caused to flow circulatingly in the bed. However, as there is not provided any gas distributor in the bed, the total amount of a fluidizing gas is fed into the bed as a gas jet stream. Consequently, there frequently occurs a so-called "blow-through phenomenon" and solid particles in the vicinity of the lower portion or the walls of the bed are hardly fluidized. Accordingly, in the process using a spouted bed, it is impossible to disperse liquid hydrocarbon uniformly throughout the bed.

The object of the present invention is to overcome the above mentioned disadvantages of the conventional processes using fluidized beds and to enable the thermal or catalytic cracking of liquid hydrocarbon in fluidized beds on an industrial scale.

Another object of the present invention is to provide a method in which the surface area of solid particles throughout a fluidized bed is utilized effectively for the production of gaseous olefins from liquid hydrocarbon.

Still another object of the present invention is to provide a method in which the atomizing effect of the nozzle is largely improved by decreasing the space density of solid particles in the vicinity of the nozzle in comparison with that of solid particles in the other portions of the bed.

The present invention provides a process for preparing olefins from liquid hydrocarbon by thermal cracking with a bed of solid particles fluidized by a fluidizing gas containing oxygen and steam at a temperature of from 600 to 1000° C. for from 0.05 to 3 seconds, characterized by feeding a part of said fluidizing gas to said fluidized bed through a gas distributor provided below the fluidized bed, directly injecting the other part of said fluidizing gas as a gas jet stream into said fluidized bed through injection openings provided to pierce said gas distributor at its central portion at a linear gas velocity higher than a superficial velocity of the whole fluidizing gas in the bed, thereby forcing the solid particles in said bed to flow circulatingly, and feeding the liquid hydrocarbon into said fluidized bed.

In the present invention, the term "fluidizing gas" means the whole amount of gas which is introduced into a fluidized bed to fluidize solid particles. A part of the fluidizing gas is fed into the fluidized bed through a gas distributor. The other part, preferably 5–95% by volume of the fluidizing gas is directly fed into the bed as a "gas jet stream" through injection openings provided to pierce the gas distributor at its central portion, whereby solid particles held up in the fluidized bed are forced to flow circulatingly.

As the fluidizing gas, a gas mixture containing steam and oxygen is used in the present invention. The fluidizing gas may contain an inert gas such as nitrogen and carbon dioxide in addition to steam and an oxygen-containing gas. It is preferred to use a fluidizing gas containing oxygen in an amount sufficient to cause a combustion of a certain part of the liquid hydrocarbon fed, by which combustion a heat sufficient to crack the remaining part of the liquid hydrocarbon fed to the olefins is generated.

Generally, the feed ratio by weight of steam to the liquid hydrocarbon ranges from 0.1 to 10, preferably from 0.4 to 0.6, which may be determined through the operation of the plant. For the purpose of maintaining the bed at a temperature necessary for cracking the liquid hydrocarbon by the heat of partial combustion of said hydrocarbon, oxygen is generally fed into the fluidized bed in an amount of from 120 to 300 Nm.³, preferably from 150 to 180 Nm.³ per ton of liquid hydrocarbon.

In the specification and claims, the linear velocity of the gas jet stream recalculated to the velocity at the temperature of said stream passing through the injection opening is defined as $U_J$ (m./sec.), and the superficial velocity in the fluidized bed of the gas required for maintaining the fluidized state, which is recalculated to the gas velocity at the temperature in the bed, is defined as $U_o$ (m./sec.). The average linear terminal velocity of the solid particles in the bed recalculated to that of the solid particles at the temperature in the bed is defined as $U_t$ (m./sec.).

In the process of the present invention, the linear velocity $U_j$ of the gas jet stream must be higher than the superficial velocity $U_o$.

Although the superficial velocity $U_o$ varies according to the average diameter of the solid particles, the particle size distribution and the kinds of the desired olefins and starting liquid hydrocarbon, the superficial velocity $U_o$ is preferably in the range of 1–10 m./sec.

The amount and linear velocity of the gas jet stream may be varied within a suitable range for realizing the forced circulation of the solid particles and maintaining a good fluidizing state. This range depends on the characteristics of the fluidized bed, such as the height of the bed, the size and distribution of the solid particles and by the kinds of intended olefins and starting hydrocarbons.

In general, the linear velocity of the gas jet stream $U_J$ (m./sec.) may be preferably varied in a range of 1.5 to 20 times the superficial velocity $U_o$ (m./sec.) and the volume flow rate of the gas jet stream $V_j$ (Nm.$^3$/hr.) may be varied in the range of 0.05 to 0.95 times the rate of the whole gas $V_o$ (Nm.$^3$/hr.) required for maintaining the fluidized bed.

By adjusting the values of $U_j/U_o$ and $V_j/V_o$ within said ranges it is possible to force the solid particles in the bed to flow circulatingly.

In the field of chemical engineering, heretofore, the injection of a gas jet stream directly into the fluidized bed without passing through a gas distributor, has been considered to induce an undesirable blow-through phenomenon. For this reason, the use of a gas jet stream in fluidized beds has never been attempted.

When the linear velocity $U_J$ of the gas jet stream, is much higher than the average terminal velocity $U_t$ of the solid particles in the bed (recalculated to that of the solid particles at the temperature of the bed), for instance, when $U_j$ is approximately more than 30 times $U_t$, there is a risk of the blow-through phenomenon, though it depends on the size of the solid particles to some extent. However, in the present invention, by adjusting the values of $U_J/U_o$ and $V_j/V_o$ within said specific ranges, namely by adopting $U_j$ in the order of less than 30, preferably less than 10 times $U_t$, it is possible to prevent the blow-through phenomenon from occurring in a fluidized bed and also to attain a satisfactory forced circulation flow os solid particles in the bed which is sufficient for attaining the above purpose.

In the present invention, as the solid particles in the fluidized bed can be used any solid particles which are chemically and physically stable at a temperature of from 600 to 1000° C. Generally, for the solid particles in the bed, the inorganic oxides, such as sand, magnesia clinker, cement clinker, alumina, silica and mulite, are preferably used.

The metallic oxides showing catalytic activities for cracking liquid hydrocarbon to olefins, such as oxides of cobalt, nickel, chromium and iron, may also be used in combination with said inorganic oxides. Cement clinker and magnesia clinker are especially preferred because they contain oxides of calcium, silicon, magnesium and the like which have a catalytic activity for thermal cracking of liquid hydrocarbon. They have also excellent mechanical properties. The average diameter of the solid particles is preferably in the order of 0.1 to 5 mm., especially 1 to 4 mm. Generally, when a fluidized bed consists of fine particles, the fine particles are carried over with the yielded gas. However, in the present invention, by using a fluidized bed of solid particles having such a specific average diameter as mentioned above, it is possible to absorb rapidly the momentum of the gas jet stream in the fluidized bed and prevent occurrence of the blow-through phenomenon.

As the liquid hydrocarbon, any liquid petroleum hydrocarbon may be used in the present invention. As the liquid petroleum hydrocarbon, there are cited crude oil and fraction- and residue-oils obtained by normal or reduced atmospheric distillation in petroleum refinery. Particularly preferred are crude oil, heavy oil, kerosene, light oil and naphtha. The liquid hydrocarbon may be fed into a fluidized bed according to an optional method. For instance, the liquid hydrocarbon may be fed into the fluidized bed through one or more nozzles provided in an opening for injecting the gas jet stream in the state coaxial with said opening or provided on the walls of a cracking furnace. Further, the liquid hydrocarbon may be fed into the fluidized bed in a form of a mixture with steam or air. In the present invention, it is preferred that the liquid hydrocarbon is fed from nozzles provided in an opening for injecting the gas jet stream in the state coaxial with said opening. Thus, it is possible to disperse uniformly the solid particles into which the liquid hydrocarobn has been blown.

In the case of using a nozzle for feeding liquid hydrocarbon provided in an opening for injecting the gas jet stream, when the oxygen concentration in the gas jet stream is too high, there sometimes occurs a back-fire phenomenon. Therefore, in such a case it is preferred not to use oxygen, or if used, to lower the oxygen concentration in the gas jet stream. Thus, it is much more preferred to use steam as the gas jet stream.

In the present invention, the liquid hydrocarbon is contacted with solid particles at a temperature of from 600 to 1000° C. for from 0.05 to 3 seconds, whereby the liquid hydrocarbon is thermally cracked to desired olefins. Cracking temperatures and contacting time may be optionally selected according to the kinds of the desired olefins and starting liquid hydrocarbon.

In the process of the present invention, for instance, in case that ethylene is desired, the liquid hydrocarbon may be subjected to temperatures ranging from 800 to 950° C. for 0.1 to 0.3 second. In case propylene or butene is desired, a lower temperature of 650 to 750° C. may be adopted.

In the conventional fluidized bed process disclosed in Japanese patent publication No. 8329/65 as it is necessary to control the size distribution of coke particles in the fluidized bed simultaneously with the thermal cracking of hydrocarbon, it is impossible to maintain the cracking temperature above 730° C.

Thus, the cracking temperatures adopted in the conventional fluidized bed processes for the production of olefin, generally, have to be maintained in a range of from 700 to 730° C. Therefore, the contacting time of feed oil in the fluidized bed have to be for from 1 to 2 seconds, and owing to such a long contacting time the formation of coke is remarkable. In order to regulate the formation of coke, it is necessary to keep the steam and oil ratio within a range from 0.7 to 1.0.

On the contrary, in the process of the present invention it becomes possible to maintain such a high cracking temperature as 800–950° C., which temperature is appropriate for obtaining the high yield of olefin. Therefore, such a low ratio of steam to liquid hydrocarbon as 0.4–0.6 is sufficient. Therefore, such a short contacting time as 0.1–0.3 second is sufficient for preparing ethylene from liquid hydrocarbon. Thus, in the process of the present invention it is possible to realize a high specific cracking rate (tons of liquid hydrocarbon cracked per m.$^3$ of a furnace per hour) of 20 to 30 times as great as that attained in the conventional processes.

In order to understand the present invention, please refer to the accompanying drawing.

The drawing is a vertical section, diagrammatically showing the outline of an example of apparatus suitable for carrying out the process of the present invention for cracking thermally liquid hydrocarbon to gaseous olefins.

As shown in the drawing, an apparatus for the thermal cracking of liquid hydrocarbon in a fluidized bed, comprising a cracking furnace 1 having an inlet 2 for feeding a part of a fluidizing gas in the lower portion and having an exhaust port 8 in the upper portion. A gas distributor 3 is provided in the lower portion of the furnace 1. For instance, a perforated plate which is made of a heat-resistant metal, may be used as the gas distributor 3. A liquid hydrocarbon feed pipe 6 is provided in the gas jet stream feed pipe 4 in the state coaxial with said feed pipe 4. A gas jet stream feed pipe 4 is provided to pierce the distributor 3 at its central portion and has an injection opening 5 to a fluidizing zone F. The hydrocarbon feed pipe 6 has a liquid hydrocarbon injection nozzle 7 at the upper end.

In another embodiment, a plurality of liquid hydrocarbon injection nozzles and a plurality of injection openings of gas jet stream may be provided.

The gas distributor 3 may preferably be shaped in a funnel form, at the bottom of which the injection nozzle 7 and the injection opening 5 of the gas jet stream are provided.

An explanation will be given with reference to the drawing. Into fluidized bed F in the furnace 1, in which solid particles are maintained in fluidizing state above gas distributor 3, a gas jet stream is injected from the injection opening 5 of gas jet stream surrounding the injection nozzle 7. As a result, the space density of solid particles in the vicinity of the injection nozzle 7 decreases in comparison with that of solid particles in the other portion of the fluidized bed. Consequently, the liquid hydrocarbon is dispersed effectively upon solid particles. Thus, the surface area of solid particles in the bed is utilized effectively and the atomization effect of the liquid hydrocarbon is improved.

Further, the other reason for providing gas jet stream injection opening 5 is to force solid particles to flow circulatingly in the bed so as to increase the rate of their dispersion. Thus, the availability of the surface area of the solid particles in the bed for thermal cracking of liquid hydrocarbon is much improved. Particularly, solid particles in the vicinity of injection nozzle 7 coated by liquid hydrocarbon are forcedly dispersed from the vicinity of injection nozzle 7 by the gas jet stream blown upward from the opening 5 around injection nozzle 7 and further dispersed into the other portions in the bed by the forced circulation flow. After the completion of the thermal cracking of liquid hydrocarbons which has been adhered to the surfaces of the solid particles, the said particles return again to the vicinity of injection nozzle 7. While the solid particles on which the liquid hydrocarbon has been blown are dispersed into the other portion of the fluidizing zone F (the upper portion of the fluidizing zone F) by means of the gas jet stream, a part of the liquid hydrocarbon is burnt and the remaining part of the liquid hydrocarbon is cracked to olefins and other gases by the heat of the partial combustion. After the liquid hydrocarbon adhered to the solid particles has been burnt away or cracked to gases, the solid particles are forced to return in the vicinity of the nozzle 7.

As in the conventional fluidized reactor a flat distributor may also be used in the present invention, but a funnel shaped gas distributor around injection openings of gas jet stream as shown in the drawing is preferable for carrying out the method of the present invention.

When the gas distributor 3 is flat, solid particles near the said gas distributor and near the reactor walls are tend to flow uneffectively.

The decrease in the motions of the solid particles induces the agglomeration of solid particles or the adhesion of solid particles to the reactor walls or to the gas distributor 3. Accordingly, gas distributor 3 of a funnel form is recommended, because this shape of the distributor improves the motion and flow of solid particles in the bed.

In the process of the present invention, it is possible to maintain a suitable dispersion state of the liquid hydrocarbon in the fluidized bed and therefore, it is also possible to crack the liquid hydrocarbon to olefins very efficiently. Further, the temperature distribution of the fluidized bed is made uniform (it is possible to maintain the maximum temperature difference within 15° C.) and control of the cracking temperature is easily attained.

The present invention is hereinafter explained more detailedly by examples.

EXAMPLE 1

Heavy oil A having the following properties:

Specific property (15/4° C.) _____ 0.821–0.892 (0.855).
Boiling point range:
    Primary fraction _____ 170–270° C.
    Flash point _____ Lower than 60° C.
    50% point _____ 260–310° C.
    Terminal point _____ Higher than 450° C.

was thermally cracked by employing a cracking furnace having a structure shown in the drawing. The particulars of the furnace are as follows:

Diameter _____ 100 mm$\phi$
Height _____ 1200 mm.
Diameter of the injection opening of a gas jet
  stream _____ 16.1 mm$\phi$
Outside diameter of the injection nozzle of
  liquid hydrocarbon _____ 10.5 mm$\phi$
Inside diameter of the injection nozzle of
  liquid hydrocarbon _____ 1.5 mm$\phi$ On the gas distributor there were provided 60 holes having a diameter of about 1 mm. As the solid particle, magnesia clinker having a diameter of 1–2 mm. was used. The bed height at the point of minimum fluidization was about 270 mm. Said heavy oil A was fed in the mixed state with air. As the fluidizing gas, a mixed gas of steam and oxygen was used, and as the gas jet stream, steam was used alone. The cracking conditions adopted and the results are shown in Table I below.

TABLE I

Cracking conditions:
    Feed rate of heavy oil A _____l./hr__ 22.0
    Feed rate of steam _____kg./hr__ 8.7
    Feed rate of oxygen _____Nm.$^3$/hr__ 3.5
    Feed rate of air _____Nm.$^3$/hr__ 15.0
    $U_o$ (820° C.) _____m./sec__ 5.0
    $U_J$ (200° C.) _____m./sec__ 25.0
    Temperature of fluidized bed _____° C__ 820±5

Composition of yielded gas (percent by weight):
    $H_2$ _____ 0.7
    $O_2$ _____ 1.0
    $N_2$ _____ 40.2
    $CO$ _____ 9.8
    $CO_2$ _____ 12.7
    $CH_4$ _____ 6.3
    $C_2H_4$ _____ 9.7
    $C_2H_6$ _____ 0.6
    Paraffins and olefins having more than 3 carbon atoms _____ 8.8
    Heavy and light oil vapors _____ 10.2
Total flow rate of the yielded gas ____Nm.$^3$/hr__ 32.4

EXAMPLE 2

Heavy oil A as defined in Example 1 and naphtha were respectively cracked by using the same cracking furnace, solid particle and fluidizing gas as those used in Example 1. The cracking conditions and results are shown in Table II below.

TABLE II

|  | Heavy Oil A | Naphtha |
| --- | --- | --- |
| Cracking Conditions: |  |  |
| Feed rate of raw hydrocarbons (l./hr.) | 35.0 | 25.4 |
| Feed rate of steam (kg./hr.) | 19.3 | 18.3 |
| Feed rate of oxygen (Nm.³/hr.) | 6.7 | 6.3 |
| $U_o$ (m./sec.) ° C. | 5(850) | 5(870) |
| $U_j$ (m./sec.; 220° C.) | 25 | 25 |
| Temperature of the fluidized bed, ° C. | 850±5 | 870±5 |
| Composition of yielded gas (percent by weight): |  |  |
| $H_2$ | 1.0 | 0.8 |
| $O_2$ | 0.7 | 1.5 |
| CO | 13.4 | 12.6 |
| $CO_2$ | 25.2 | 24.0 |
| $CH_4$ | 8.8 | 7.0 |
| $C_2H_4$ | 20.1 | 22.1 |
| $C_2H_6$ | 0.8 | 1.2 |
| Paraffins and olefins having more than 3 carbon atoms | 11.0 | 18.4 |
| Oil vapor | 19.0 | 12.4 |
| Total flow rate of the yielded gas, Nm.³/hr. | 16.2 | 16.0 |

EXAMPLE 3

Minas crude oil having the following properties:

Specific gravity:
  API (60° F.) _____ 36.1
  (15/4° C.) _____ 0.844
Flash point (° C.) _____ ____
Pour point (° C.) _____ 35
Sulphur content (wt. percent) _____ 0.09
Wax content (wt. percent) _____ 17.7
Fractions:
  Gasoline fraction (vol. percent) _____ 16
  Kerosene fraction (vol. percent) _____ 12
  Light oil fraction (vol. percent) _____ 8
  Residual oil _____ 63
  Gas+cracking loss _____ 1 was thermally cracked by using the same apparatus as in Example 1 except that the furnace height is changed to 1800 mm. and the bed height at the point of minimum fluidization was about 270 mm. The cracking conditions and results are shown in Table III below.

TABLE III

|  | Minas crude | Minas crude |
| --- | --- | --- |
| Cracking conditons: |  |  |
| Feed rate of liquid hydrocarbon (l./hr.) | 40 | 80 |
| Feed rate of steam (kg./hr.) | 25.4 | 24.6 |
| Feed rate of oxygen (Nm.³/hr.) | 10.9 | 15.7 |
| $U_o$ (m./sec.; at 880° C.) | 9.3 | 12.9 |
| $U_j$ (m./sec.; at 400° C.) | 3.60 | 36.0 |
| Temperature of the fluidized bed (° C.) | 880 | 880 |
| Size of magnesia clinker (mm. $\phi$) | 2–4 | 2–4 |
| Composition of yielded gas, (Vol. %) excluding oil vapor: |  |  |
| $H_2$ | 15.4 | 15.9 |
| $O_2$ | 0.2 | 0.3 |
| CO | 16.8 | 17.5 |
| $CO_2$ | 19.8 | 17.5 |
| $CH_4$ | 15.1 | 14.8 |
| $C_2H_2$ | 1.5 | 1.3 |
| $C_2H_4$ | 24.6 | 25.0 |
| $C_2H_6$ | 1.6 | 1.3 |
| $C_3H_6$ | 3.0 | 4.0 |
| $C_4$ fraction | 0.5 | 0.7 |
| $C_5$ fraction | 0.9 | 1.2 |
| $N_2$ | 0.6 | 0.5 |
| Yield (kg./ton crude oil): |  |  |
| $C_2H_4$ | 346 | 332 |
| $C_3H_6$ | 65 | 82 |
| $C_4$ fraction | 15 | 19 |
| Oil vapor | 92 | 115 |
| Total flow rate of yielded gas (Nm.³/hr.) | 36.0 | 68.0 |

What we claim is:

1. In a process for preparing olefins from liquid hydrocarbons which comprises cracking a liquid hydrocarbon by contacting said hydrocarbon with a bed of solid particles fluidized by a fluidizing gas ontaining oxygen and steam at a temperature of from 600° to 1000° C. for from 0.05 to 3 seconds, an improvement which comprises feeding a part of said fluidizing gas to said fluidized bed through a gas distributor provided below said fluidized bed, directly injecting the other part of said fluidizing gas as a gas jet stream into said fluidized bed through injection openings provided to pierce said gas distributor at its central portion at a linear gas velocity higher than the superficial velocity of the whole fluidizing gas in the bed, thereby forcing the solid particles in said bed to flow circulatingly and feeding the liquid hydrocarbon into said fluidized bed, said fluidizing gas containing oxygen in an amount sufficient to cause a combustion of a certain part of the liquid hydrocarbon feed, said combustion generating a heat sufficient to crack the remaining part of the liquid hydrocarbon feed to olefins.

2. The process according to claim 1 wherein the liquid hydrocarbon and the fluidizing gas are fed at a weight ratio of steam to the liquid hydrocarbon ranging from 0.1 to 10.

3. The process according to claim 1 wherein the liquid hydrocarbon and the fluidizing gas are fed at such a ratio that from 120 to 300 Nm.³ of oxygen is fed per ton of the liquid hydrocarbon.

4. The process according to claim 1 wherein the solid particles are particles of a solid inorganic oxide having a diameter of 0.1–5 mm.

5. The process according to claim 1 wherein the liquid hydrocarbon is liquid petroleum hydrocarbon.

6. The process according to claim 1 wherein the liquid hydrocarbon is directly injected into said fluidized bed together with the gas jet stream.

7. The process according to claim 1 wherein the gas distributor is of a funnel form.

8. In a process for preparing olefins from liquid hydrocarbons which comprises cracking a liquid hydrocarbon by contacting said hydrocarbon with a bed of solid particles fluidized by a fluidizing gas containing oxygen and steam at a temperature of from 600° to 1000° C. for from 0.05 to 3 seconds, an improvement which comprises feeding a part of said fluidizing gas to said fluidized bed through a gas distributor provided below the fluidized bed, directly injecting the other part of said fluidizing gas as a gas jet stream into said fluidized bed through injection openings provided to pierce said gas distributor at its central portion at a linear velocity higher than a superficial velocity of the whole fluidizing gas in the bed, thereby forcing the solid particles in said bed to flow circulatingly and feeding the liquid hydrocarbon into said fluidized bed, the liquid hydrocarbon and the fluidizing gas being fed at a weight ratio of steam to the liquid hydrocarbon ranging from 0.1 to 10 and at such a ratio that from 120 to 300 Nm.³ of oxygen is fed per ton of the liquid hydrocarbon, wherein the linear velocity of the gas jet stream $U_j$ (m./sec.) recalculated to the velocity at the temperature of said gas stream passing through the injection opening is adjusted within a range of 1.5 to 20 times the superficial velocity in the fluidized bed $U_o$ (m./sec.) of the whole gas required for maintaining the fluidized state, which is recalculated to the gas velocity at the temperature in the bed and the volume flow rate of the gas jet stream $V_j$ (Nm.³/hr.) is adjusted within a range of 0.05 to 0.95 times the volume flow rate of the whole gas $V_o$ (Nm.³/hr.) required for maintaining the fluidized state in the fluidized bed.

References Cited

UNITED STATES PATENTS

| 2,689,973 | 9/1954 | Lee et al. | 208—158 |
| 2,707,702 | 5/1955 | Watson | 208—127 |
| 2,709,675 | 5/1955 | Phinney | 208—127 |
| 2,786,280 | 3/1957 | Gishler et al. | 208—153 |
| 2,968,683 | 1/1961 | Kossmann | 260—683 |
| 3,238,271 | 3/1966 | Nonnenmacher et al. | 260—683 |

DELBERT E. GANTZ, Primary Examiner

C. E. SPRESSER, JR., Assistant Examiner

U.S. Cl. X.R.

208—127, 158